(12) United States Patent
Xiao et al.

(10) Patent No.: US 9,023,911 B2
(45) Date of Patent: May 5, 2015

(54) FRAME SEALANT, PROCESS FOR PREPARING SAME AND USE THEREOF

(71) Applicant: Beijing BOE Optoelectronics Technology Co.,Ltd., Beijing (CN)

(72) Inventors: Ang Xiao, Beijing (CN); Haibo Zhu, Beijing (CN); Sung Hun Song, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/027,686

(22) Filed: Sep. 16, 2013

(65) Prior Publication Data

US 2014/0078457 A1    Mar. 20, 2014

(30) Foreign Application Priority Data

Sep. 17, 2012  (CN) .......................... 2012 1 0345855

(51) Int. Cl.
| | | |
|---|---|---|
| C08F 2/46 | (2006.01) | |
| C08G 61/04 | (2006.01) | |
| G02F 1/1339 | (2006.01) | |
| C08L 33/12 | (2006.01) | |
| C08K 5/06 | (2006.01) | |
| G02F 1/1341 | (2006.01) | |

(52) U.S. Cl.
CPC ............... *G02F 1/1339* (2013.01); *C08L 33/12* (2013.01); *C08K 5/06* (2013.01); *G02F 2001/13415* (2013.01)

(58) Field of Classification Search
CPC .................... G02F 1/1339; G02F 2001/13415; C08L 33/12; C08L 63/00; C08L 63/10; C08K 5/06
USPC .................................................. 522/1; 520/1
See application file for complete search history.

(56) References Cited

U.S. PATENT DOCUMENTS 6,312,801 B1   11/2001 Kim et al.

FOREIGN PATENT DOCUMENTS

| CN | 1752162 | * | 3/2006 |
|---|---|---|---|
| CN | 101654607 A | | 2/2010 |
| CN | 102516916 A | | 6/2012 |
| CN | 102585745 A | | 7/2012 |
| WO | 00/06661 A1 | | 2/2000 |
| WO | 0006661 A1 | | 2/2000 |

OTHER PUBLICATIONS

Cui, CN 1752162 Machine Translation, Mar. 29, 2006.*
First Office Action issued by State Intellectual Property Office of the People's Republic of China for Chinese Patent Application No. 2012103458559 dated Aug. 20, 2013, 4pgs.
English translation of First Office Action issued by State Intellectual Property Office of the People's Republic of China for Chinese Patent Application No. 2012103458559 dated Aug. 20, 2013, 3pgs.
Second Office Action issued by State Intellectual Property Office of the People's Republic of China for Chinese Patent Application No. 2012103458559 dated Feb. 10, 2014, 5pgs.
English translation of Second Office Action issued by State Intellectual Property Office of the People's Republic of China for Chinese Patent Application No. 2012103458559 dated Feb. 10, 2014, 3pgs.
English translation of Chinese Patent Application No. 101654607, 20pgs.
English translation of Chinese Patent Application No. 102516916, 26pgs.
English translation of Chinese Patent Application no. 102585745, 35pgs.
First Office Action dated Aug. 20, 2013 issued by State Intellectual Property Office of the People's Republic of China in connection with Chinese counterpart application, Chinese National Application No. 201210345855.9 (Chinese).
English translation of First Office Action dated. Aug. 20, 2013 issued by State Intellectual Property Office of the People's Republic of China in connection with Chinese counterpart application, Chinese National Application No. 201210345855.9.
Second Office Action dated Feb. 10, 2014 (most recent office action prior to the decision to grant a patent) issued by State Intellectual Property Office of the People's Republic of China in connection with Chinese counterpart application, Chinese National Application No. 201210345855.9 (Chinese).
English translation of Second Office Action dated Feb. 10, 2014 (most recent office action prior to the decision to grant a patent) issued by State Intellectual Property Office of the People's Republic of China in connection with Chinese counterpart application, Chinese National Application No. 201210345855.9.
Notification to Grant the Patent Right dated Apr. 30, 2014 issued by State Intellectual Property Office of the People's Republic of China in connection with Chinese counterpart application, Chinese National Application No. 201210345855.9 (Chinese).

(Continued)

*Primary Examiner* — Ling Choi
*Assistant Examiner* — Jessica E Whiteley

(57) ABSTRACT

Embodiments of the invention provide a frame sealant and a process for preparing the same, as well as use thereof. The frame sealant comprises, by weight, 25%-30% acrylic resins, 25%-30% oligomers as shown in Structure Formula I, 10%-15% organic powders, 10%-15% inorganic powders, 0%-10% epoxy resins, 10%-15% heat curing agents, 0.1%-1% photoinitiators, and 0.1%-1% coupling agents, wherein, in Structure Formula I, n indicates an integer of 10-20.

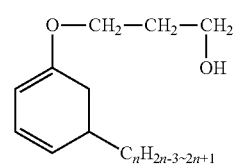

I

16 Claims, 1 Drawing Sheet

(56) References Cited

OTHER PUBLICATIONS

English translation of Notification to Grant the Patent Right dated Apr. 30, 2014 issued by State Intellectual Property Office of the People's Republic of China in connection with Chinese counterpart application, Chinese National Application No. 201210345855.9.

English machine translation of Chinese Patent Document No. CN 101654607 A (above).
English machine translation of Chinese Patent Document No. CN 102585745 A (above).
English machine translation of Chinese Patent Document No. CN 102516916 A (above).

* cited by examiner

FRAME SEALANT, PROCESS FOR PREPARING SAME AND USE THEREOF

CROSS REFERENCE TO RELATED APPLICATIONS

This application claims priority from Chinese National Application No. 201210345855.9 filed on Sep. 17, 2012, the contents of which are incorporated herein by reference.

FIELD OF INVENTION

Embodiments of the invention relate to a frame sealant and a process for preparing the same, as well as use thereof.

BACKGROUND OF INVENTION

ODF (one drop filling) process is a key step during the manufacture of a liquid crystal panel. As shown in FIG. 1, a liquid crystal 2 is dropped onto the TFT substrate 1, a frame sealant 4 is coated onto the colored film substrate 3, and the TFT substrate 1 and the colored film substrate 3 are assembled using a cell assembly process so as to complete the manufacture of the liquid crystal panel. During the manufacture, the primary function of the frame sealant is to bond the TFT substrate 1 and the colored film substrate 3, as well as to seal the liquid crystal within the liquid crystal cell to prevent the contamination of the liquid crystal from the external environment. Here, the frame sealant 4, i.e., an uncured frame sealant 4, has a low viscosity, about 300±50 Pa·s at 25° C., and it appears pasty. After the assembly of the TFT substrate 1 and the colored film substrate 3, it is irradiated by a certain level of UV light and subjected to heating, thereby curing the frame sealant 4, so as to bond the TFT substrate 1 and the colored film substrate 3 together. Now, the frame sealant 4 has a significantly elevated viscosity and appears as a solid. The aforementioned heating process enables further strengthening of the curing level of the frame sealant, thereby enhancing the adhesion of the frame sealant.

Alignment precision is a crucial parameter in the ODF process and is typically measured after UV curing. The so-called alignment precision means the deviation between the alignment markers set at corresponding positions on both the TFT substrate 1 and the colored film substrate 3. Irregular oscillation, the static viscosity of the frame sealant, and the shrinkage of the frame sealant after UV irradiation all affect the alignment precision. With an increasing demands for higher pixels, higher contrast and higher picture quality of the display product, the criteria for the alignment precision has become higher and higher. Too low an alignment precision will cause leakage of light around pixels, thereby reducing the contrast and affecting the picture quality. The existing frame sealants do not have a high static viscosity, with a high shrinkage upon UV curing, causing the issues of poor alignment precision and picture quality.

SUMMARY OF INVENTION

An embodiment of the invention provides a frame sealant, comprising, by weight, 25%-30% acrylic resins, 25%-30% oligmers as shown in Structure Formula I, 10%-15% organic powders, 10%-15% inorganic powders, 0%-10% epoxy resins, 10%-15% heat curing agents, 0.1%-1% photoinitiators, 0.1%-1% coupling agents,

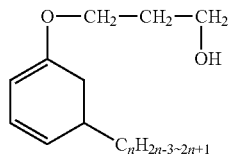

Wherein, n indicates an integer of 10-20.

An embodiment of the invention further relates to a liquid crystal display device comprising an array substrate and a counter substrate opposing to the array substrate, wherein a frame sealant according to an embodiment of the invention is disposed between the array substrate and counter substrate.

DETAILED DESCRIPTION OF INVENTION

Figure 1:
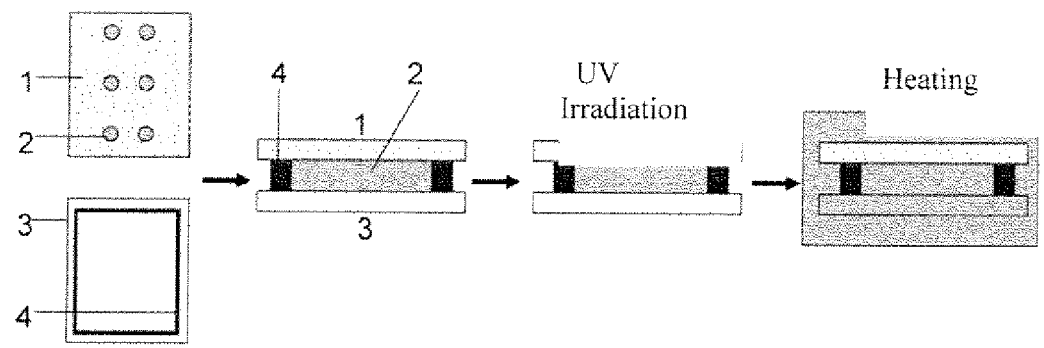
FIG. 1 is a schematic diagram showing the ODE process.

An embodiment of the invention provides a frame sealant, which comprises, by weight, 25%-30% (such as 25%, 27%, 28%, 30%) acrylic resins, 25%-30% (such as 25%, 27%, 28%, 30%) oligmers as shown in Structure Formula I, 10%-15% (such as 10%, 12%, 13%, 15%) organic powders, 10%-15% (such as 10%, 12%, 14%, 15%) inorganic powders, 0%-10% (such as 0%, 1%, 5%, 7%, 9%, 10%) epoxy resins, 10%-15% (such as 10%, 11%, 13%, 15%) heat curing agents, 0.1%-1% (such as 0.1%, 0.5%, 1%) photoinitiators, and 0.1%-1% (such as 0.1%, 0.5%, 1%) coupling agents,

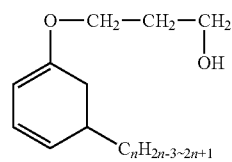

Wherein, n indicates an integer of 10-20, for example, n may be 10, 15, 20, and is not limited to these numbers. The oligomers can enhance the toughness and binding strength of the frame sealant as a whole after curing.

The aforementioned acrylic resins can be selected from common acrylic resins in the art, such as methyl methacrylate, n-butyl methacrylate, ethyl acrylate, n-butyl acrylate, and the like.

The aforementioned organic powders can be selected from common organic powders in the art, such as n-butyl acrylate resin elastic spheres, n-butyl methacrylate resin elastic spheres, and the like. The organic powders can enhance the toughness and binding strength of the frame sealant.

The aforementioned inorganic powders can be selected from common inorganic powders in the art, such as silicon dioxide glass microsphere, and the like. The inorganic powders can enhance the water resistance and reliability of the frame sealant.

The aforementioned epoxy resins can be selected from common epoxy resins in the art, such as bisphenol A type epoxy resin E-51, E-44 (manufactured by Shanghai Resin Plant), and the like.

The aforementioned heat curing agents can be selected from common heat curing agents in the art, such as 3,5-dimethylaniline, 4-methylaniline, and the like.

The aforementioned photoinitiators can be selected from common photoinitiators in the art, such as 2,2-diethoxyacetophenone, 1-hydroxycyclohexylphenylketone, and the like.

The aforementioned coupling agents can be selected from common coupling agents in the art, such as silane coupling agents, such as KH550 (manufactured by United Carbide, USA), and the like.

A frame sealant according to an embodiment of the invention may comprise, for example, by weight, 25%-30% acrylic resins, 25%-30% oligmers as shown in Structure Formula I, 10%-15% organic powders, 10%-15% inorganic powders, 9%-10% epoxy resins, 10%-15% heat curing agents, 0.5%-1% photoinitiators, and 0.5%-1% coupling agents.

A frame sealant according to an embodiment of the invention may comprise, for example, by weight, 25%-27% acrylic resins, 27%-30% oligmers as shown in Structure Formula I, 12%-15% organic powders, 12%-15% inorganic powders, 9%-10% epoxy resins, 11%-15% heat curing agents, 0.5%-1% photoinitiators, and 0.5%-1% coupling agents.

In a frame sealant according to an embodiment of the invention, the oligomers I may be oligomers as shown in the following Structure Formula II,

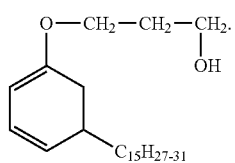

In an embodiment, the frame sealant may comprise, for example, by weight, 25% acrylic resins, 30% oligomers as shown in Structure Formula II, 12% organic powders, 12% inorganic powders, 9% epoxy resins, 11% heat curing agents, 0.5% photoinitiators, and 0.5% coupling agents.

In an embodiment, the frame sealant may comprise, for example, by weight, 27% acrylic resins, 27% oligomers as shown in Structure Formula II, 10% organic powders, 10% inorganic powders, 10% epoxy resins, 15% heat curing agents, 0.5% photoinitiators, and 0.5% coupling agents.

In a frame sealant according to an embodiment of the invention, the organic powders can be elastic spheres, the acrylic resins can be methyl methacrylate, the inorganic powders can be silicon dioxide, the epoxy resins can be bisphenol A epoxy resins, the heat curing agents can be 3,5-dimethylaniline, the photoinitiators can be 2,2-diethoxyacetophenone, and the coupling agents can be silane coupling agents.

An embodiment of the invention further relates to a process for preparing the aforementioned frame sealant, comprising the steps of:

(1) weighing the various components of the frame sealant to form a mixture;
(2) mixing and agitating the mixture; and
(3) defoaming the mixture.

An embodiment of the invention further relates to the use of the aforementioned frame sealant in the manufacture of a liquid crystal display panel.

Moreover, an embodiment of the invention further relates to a liquid crystal display device comprising an array substrate and a counter substrate opposing to the array substrate, wherein a frame sealant according to an embodiment of the invention is disposed between the array substrate and counter substrate.

Figure 2:
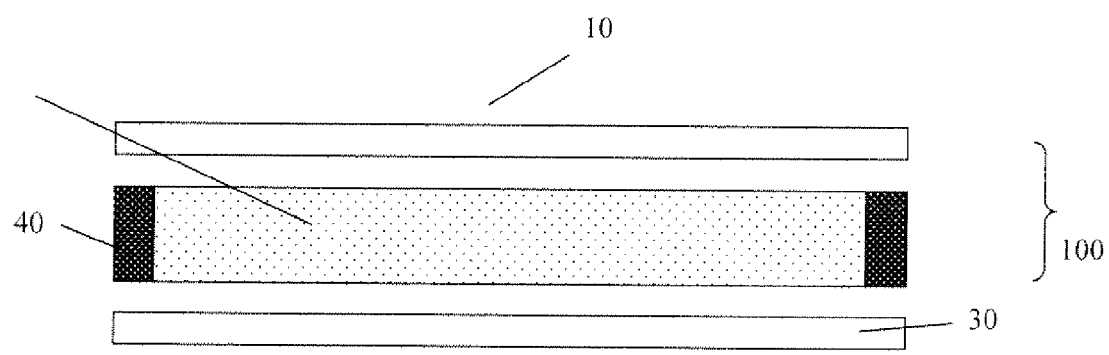
FIG. 2 is a schematic diagram of a liquid display device sealed by a frame sealant according to an embodiment of the invention.

An example of the liquid crystal display device is presented as a liquid crystal display device 100 as shown in FIG. 2, wherein an array substrate 30 is aligned with a counter substrate 10, which are bound together by means of a frame sealant 40 according to an embodiment of the invention to form a liquid crystal cell in which liquid crystal materials 20 are filled. The counter substrate 10 is, for example, a colored film substrate.

The frame sealants prepared according to an embodiment of the invention have an elevated static viscosity and reduced shrinkage after UV curing. Therefore, when a frame sealant according to an embodiment of the invention is used in the manufacture of the liquid crystal display device, the alignment precision of the array substrate and the colored film substrate can be improved, thereby improving the picture quality.

The invention is illustrated below in details by way of specific examples, although the invention is not limited to these examples. Any other examples based on the examples in the invention obtained by a person of ordinary skill in the art without resorting to inventive work would fall into the scope of the invention.

Example 1

Preparation of the Frame Sealant

At room temperature (23-25° C.), 25 g methyl methacrylate as the acrylic resin, 30 g oligomer NX-2020 (manufactured by Cardiolite Co.) as shown in Structure Formula II, 12 g elastic sphers as the organic powder, 12 g silicon dioxide as the inorganic powder, 9 g bisphenol A epoxy resin, 11 g 3,5-dimethylaniline as the heat curing agent, 0.5 g 2,2-diethoxyacetophenone as the photoinitiator, and 0.5 g silane coupling agent (KH550, manufactured by United Carbide, USA) as the coupling agent are individually weighed out, respectively.

The aforementioned raw materials are charged into a stirred tank and stirred for 30 min-60 min (such as 60 min) at a temperature of lower than 30° C. (such as about 20° C.); and then the stirred raw materials are compounded three times under the conditions of 30° C.-50° C. (preferably 40° C.), each for 30 min.

Defoaming is conducted using a SIENOX defoamer (Model CEN-3000D).

The viscosity of the frame sealant is adjusted with a low-viscosity epoxy acrylate light-curable resin using a method well known to a person skilled in the art so that its viscosity is controlled within 250±50 Pa·s.

Impurities are removed by filtration, thereby yielding the frame sealant of the example of the invention.

Example 2

At room temperature, 25 g methyl methacrylate as the acrylic resin, 25 g oligomer NX-2020 (manufactured by Cardiolite Co.) as shown in Structure Formula II, 15 g elastic sphers as the organic powder, 14 g silicon dioxide as the inorganic powder, 9 g bisphenol A epoxy resin, 11 g 3,5-dimethylaniline as the heat curing agent, 0.5 g 2,2-diethoxyacetophenone as the photoinitiator, and 0.5 g silane coupling agent as the coupling agent are individually weighed out, respectively.

The aforementioned raw materials are charged into a stirred tank and stirred for 50 min at a temperature of lower than 30° C.; and then the stirred raw materials are compounded three times at 50° C., each for 30 min.

Defoaming is conducted using a SIENOX defoamer.

The viscosity of the frame sealant is adjusted with a low-viscosity epoxy acrylate light-curable resin using a method well known to a person skilled in the art so that its viscosity is controlled within 250±50 Pa·s.

Impurities are removed by filtration, thereby yielding the frame sealant of the example of the invention.

Example 3

At room temperature, 30 g methyl methacrylate as the acrylic resin, 30 g oligomer NX-2020 (manufactured by Cardiolite Co.) as shown in Structure Formula II, 13 g elastic sphers as the organic powder, 15 g silicon dioxide as the inorganic powder, 10 g 3,5-dimethylaniline as the heat curing agent, 1 g 2,2-diethoxyacetophenone as the photoinitiator, and 1 g silane coupling agent as the coupling agent are individually weighed out, respectively.

The aforementioned raw materials are charged into a stirred tank and stirred for 60 min at a temperature of lower than 30° C.; and then the stirred raw materials are compounded three times at 50° C., each for 40 min.

Defoaming is conducted using a SIENOX defoamer.

The viscosity of the frame sealant is adjusted with a low-viscosity epoxy acrylate light-curable resin using a method well known to a person skilled in the art so that its viscosity is controlled within 250±50 Pa·s.

Impurities are removed by filtration, thereby yielding the frame sealant of the example of the invention.

Example 4

At room temperature, 27 g methyl methacrylate as the acrylic resin, 27 g oligomer NX-2020 (manufactured by Cardiolite Co.) as shown in Structure Formula II, 10 g elastic sphers as the organic powder, 10 g silicon dioxide as the inorganic powder, 10 g bisphenol A epoxy resin, 15 g 3,5-dimethylaniline as the heat curing agent, 0.5 g 2,2-diethoxyacetophenone as the photoinitiator, and 0.5 g silane coupling agent as the coupling agent are individually weighed out, respectively.

The aforementioned raw materials are charged into a stirred tank and stirred for 50 min at a temperature of lower than 30° C.; and then the stirred raw materials are compounded three times at 50° C., each for 30 min.

Defoaming is conducted using a SIENOX defoamer.

The viscosity of the frame sealant is adjusted with a low-viscosity epoxy acrylate light-curable resin using a method well known to a person skilled in the art so that its viscosity is controlled within 250±50 Pa·s.

Impurities are removed by filtration, thereby yielding the frame sealant of the example of the invention.

Measurement of Static Viscosity

In the examples of the invention, the viscosity measured with the rotating speed at 0.1 rpm is considered as the static viscosity. The viscosities of an existing frame sealant, S-WB21 (manufactured by Sekisui Jushi Co. Ltd., Japan) and the frame sealant prepared in Example 1, are measured using an E type viscosimeter (manufactured by Brookfield Co., USA) with the rotating speed at 0.1 rpm, i.e., static viscosities. It should be noted that the existing frame sealant S-WB21 does not comprise the oligmers as shown in Structure Formula I of the examples of the invention, and it typically comprises, by weight, 60%-65% methyl acrylate resin, 5%-10% n-butyl acrylate elastic spheres, 5%-10% silicon dioxide glass microspheres, 5%-10% epoxy methyl acrylate resins, 5%-10% heat curing agents, less than 1% photoinitiators, and less than 1% coupling agent KH550. The results show that the static viscosity of the existing frame sealant S-WB21 is 326 Pa·s, and the static viscosity of the frame sealant prepared in Example 1 is 403 Pa·s. It can thus be seen that the static viscosity of S-WB21 is significantly lower than the static viscosity of the frame sealant of the example of the invention.

The aforementioned static viscosity testing is used to measure the static viscosities of the frame sealants prepared in Examples 2-4. The results show that all frame sealants prepared in the invention have static viscosity higher than that of S-WB21.

Measurement of Shrinkage after Curing

The shrinkage of the existing frame sealant S-WB21 and that of the frame sealants prepared in the aforementioned Examples 1-4 after UV curing are individually measured. Each frame sealant is made into a 1 mm thick film, and its density is measured as the density before UV irradiation. Subsequently, the film is placed between two pieces of glasses and irradiated at the UV illuminance of 100 mJ/cm$^2$·s for 30 s, followed by measuring the density of the film after UV curing. The shrinkage of the frame sealant after curing is calculated by comparing the densities of the frame sealant before and after UV curing, and the results are shown in Table 1 below. It can be seen for Table 1 that the frame sealants prepared in Examples 1-4 all have curing shrinkage lower than the existing frame sealant S-WB21.

TABLE 1

| | Frame sealant | | | | |
|---|---|---|---|---|---|
| | S-WB21 | Example 1 | Example 2 | Example 3 | Example 4 |
| Shrinkage | 7.29% | 4.66% | 5.03% | 4.16% | 4.87% |

Measurement of Alignment Precision

Liquid crystal panels are manufactured by the same ODF process, using the existing frame sealant S-WB21 and the frame sealants prepared in Examples 1-4, respectively, and the alignment precisions of the liquid crystal panels are measured. Five liquid crystal panels are manufactured under the same conditions using each frame sealant, and their alignment precisions are measured after UV curing. The testing points are the four corners of the liquid crystal panels, where the displacements of each corner along the x and y-axes are measured. For example, 1x and 1y in Table 2 below are the displacements along the x and y-axes at the location of the first corner. When the displacement is less than 5.5 um, it is determined to meet the criteria for alignment precision. When the displacement is 5.5 um or greater, it is determined not to meet the criteria for alignment precision. The alignment precisions measured in each corner are shown in Table 2.

TABLE 2

| Frame Sealant | Panel | Displacements along the x or y-axis at the four testing points (um) | | | | | | | |
|---|---|---|---|---|---|---|---|---|---|
| | | 1x | 1y | 2x | 2y | 3x | 3y | 4x | 4y |
| S-WB21 | 1 | 7.16 | 1.13 | 6.10 | 1.48 | 2.86 | 1.70 | 7.37 | 0.82 |
| | 2 | 7.37 | 0.61 | 4.37 | 0.36 | 4.37 | 0.30 | 7.47 | 0.65 |
| | 3 | 7.41 | 0.99 | 4.07 | 0.17 | 2.42 | 0.21 | 7.07 | 0.13 |
| | 4 | 6.95 | 0.38 | 7.48 | 0.75 | 4.08 | 0.60 | 8.14 | 0.33 |

TABLE 2-continued

| Frame Sealant | Panel | \multicolumn{8}{c}{Displacements along the x or y-axis at the four testing points (um)} | | | | | | | |
|---|---|---|---|---|---|---|---|---|---|
| | | 1x | 1y | 2x | 2y | 3x | 3y | 4x | 4y |
| Example 1 | 5 | 3.14 | 0.14 | 3.99 | 1.40 | 4.28 | 0.80 | 3.29 | 1.65 |
| | 6 | 0.75 | 2.2 | 3.84 | 1.20 | 1.74 | 1.38 | 0.45 | 1.42 |
| | 7 | 0.06 | 0.53 | 1.01 | 0.50 | 3.75 | 0.82 | 0.76 | 1.98 |
| | 8 | 1.44 | 0.61 | 1.15 | 1.76 | 1.00 | 0.90 | 1.08 | 0.04 |
| Example 2 | 9 | 2.51 | 0.75 | 3.83 | 4.53 | 3.80 | 2.87 | 2.88 | 0.65 |
| | 10 | 1.26 | 0.53 | 0.56 | 3.64 | 0.76 | 4.46 | 1.68 | 3.31 |
| | 11 | 2.83 | 4.61 | 4.67 | 3.03 | 0.79 | 0.41 | 4.98 | 0.85 |
| | 12 | 3.47 | 1.07 | 0.92 | 2.81 | 3.94 | 0.71 | 0.92 | 3.94 |
| Example 3 | 13 | 3.67 | 1.56 | 4.92 | 0.43 | 1.95 | 1.64 | 1.85 | 4.42 |
| | 14 | 2.67 | 0.64 | 1.73 | 3.42 | 4.10 | 2.55 | 4.02 | 3.64 |
| | 15 | 4.87 | 4.15 | 2.50 | 3.46 | 1.98 | 4.91 | 3.38 | 2.58 |
| | 16 | 1.89 | 4.65 | 4.41 | 2.55 | 0.85 | 1.37 | 1.53 | 0.59 |
| Example 4 | 17 | 4.05 | 1.60 | 2.21 | 4.30 | 4.49 | 2.17 | 1.63 | 4.08 |
| | 18 | 4.46 | 2.43 | 3.94 | 3.82 | 1.43 | 2.62 | 2.55 | 3.71 |
| | 19 | 1.62 | 3.70 | 2.25 | 4.88 | 3.82 | 0.70 | 2.56 | 4.56 |
| | 20 | 2.90 | 2.64 | 3.89 | 1.71 | 1.49 | 2.58 | 1.20 | 4.42 |

It can be seen from Table 2 that when the liquid crystal panels are manufactured using the frame sealants prepared in Examples 1-4, the displacements at four corners are all less than 5.5 um, in which the alignment precision of Example 1 is particularly excellent. However, when the existing frame sealant S-WB21 is used to manufacture the liquid crystal panel, the displacements at certain corners exceed 5.5 um, showing a reduced alignment precision as compared to the frame sealants of the examples of the invention.

It is obvious that a person skilled in the art can make various modifications and variations to the examples of the invention without departing from the spirits and scope of the invention. As such, if these modifications and variations to the examples of the invention fall into the scope of the claims of the invention and equivalents thereof, these modifications and variations are intended to be encompassed by the invention.

The invention claimed is:

1. A frame sealant, comprising by weight, 25%-30% methyl methacrylate, n-butyl methacrylate, ethyl acrylate or n-butyl acrylate, 25%-30% oligomers as shown in Structure Formula II, 10%-15% organic powders, 10%-15% inorganic powders, 0%-10% epoxy resins, 10%-15% heat curing agents, 0.1%-1% photoinitiators, and 0.1%-1% coupling agents, wherein the organic powders are n-butyl acrylate resin elastic spheres or n-butyl methacrylate resin elastic spheres,

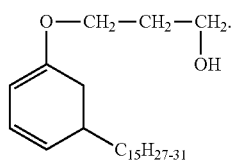

2. The frame sealant according to claim 1, wherein the frame sealant comprises, by weight, 25%-30% methyl methacrylate, n-butyl methacrylate, ethyl acrylate or n-butyl acrylate, 25%-30% oligomers as shown in Structure Formula II, 10%-15% organic powders, 10%-15% inorganic powders, 9%-10% epoxy resins, 10%-15% heat curing agents, 0.5%-1% photoinitiators, and 0.5%-1% coupling agents.

3. The frame sealant according to claim 2, wherein the frame sealant comprises, by weight, 25%-27% methyl methacrylate, n-butyl methacrylate, ethyl acrylate or n-butyl acrylate, 27%-30% oligomers as shown in Structure Formula II, 12%-15% organic powders, 12%-15% inorganic powders, 9%-10% epoxy resins, 11%-15% heat curing agents, 0.5%-1% photoinitiators, and 0.5%-1% coupling agents.

4. The frame sealant according to claim 1, wherein the frame sealant comprises, by weight, 25% methyl methacrylate, n-butyl methacrylate, ethyl acrylate or n-butyl acrylate, 30% oligomers as shown in Structure Formula II, 12% organic powders, 12% inorganic powders, 9% epoxy resins, 11% heat curing agents, 0.5% photoinitiators and 0.5% coupling agents.

5. The frame sealant according to claim 4, wherein the frame sealant comprises methyl methacrylate, the inorganic powders are silicon dioxide, the epoxy resins are bisphenol A epoxy resins, the heat curing agents are 3,5-dimethylaniline, the photoinitiators are 2,2-diethoxyacetophenone, and the coupling agents are silane coupling agents.

6. The frame sealant according to claim 1, wherein the frame sealant comprises, by weight, 27% methyl methacrylate, n-butyl methacrylate, ethyl acrylate or n-butyl acrylate, 27% oligomers as shown in Structure Formula II, 10% organic powders, 10% inorganic powders, 10% epoxy resins, 15% heat curing agents, 0.5% photoinitiators and 0.5% coupling agents.

7. The frame sealant according to claim 6, wherein the frame sealant comprises methyl methacrylate, the inorganic powders are silicon dioxide, the epoxy resins are bisphenol A epoxy resins, the heat curing agents are 3,5-dimethylaniline, the photoinitiators are 2,2-diethoxyacetophenone, and the coupling agents are silane coupling agents.

8. A liquid crystal display device comprising an array substrate and a colored film substrate opposing to the array substrate, wherein the frame sealant according to claim 1 is disposed between the array substrate and the colored film substrate.

9. The liquid crystal display device according to claim 8, wherein the frame sealant comprises, by weight, 25%-30% methyl methacrylate, n-butyl methacrylate, ethyl acrylate or n-butyl acrylate, 25%-30% oligomers as shown in Structure Formula II, 10%-15% organic powders, 10%-15% inorganic powders, 9%-10% epoxy resins, 10%-15% heat curing agents, 0.5%-1% photoinitiators, and 0.5%-1% coupling agents.

10. The liquid crystal display device according to claim 9, wherein the frame sealant comprises, by weight, 25%-27% methyl methacrylate, n-butyl methacrylate, ethyl acrylate or n-butyl acrylate, 27%-30% oligomers as shown in Structure Formula II, 12%-15% organic powders, 12%-15% inorganic powders, 9%-10% epoxy resins, 11%-15% heat curing agents, 0.5%-1% photoinitiators, and 0.5%-1% coupling agents.

11. The liquid crystal display device according to claim 8, wherein the frame sealant comprises, by weight, 25% methyl methacrylate, n-butyl methacrylate, ethyl acrylate or n-butyl acrylate, 30% oligomers as shown in Structure Formula II, 12% organic powders, 12% inorganic powders, 9% epoxy resins, 11% heat curing agents, 0.5% photoinitiators and 0.5% coupling agents.

12. The liquid crystal display device according to claim 11, wherein the frame sealant comprises methyl methacrylate, the inorganic powders are silicon dioxide, the epoxy resins are bisphenol A epoxy resins, the heat curing agents are 3,5-dimethylaniline, the photoinitiators are 2,2-diethoxyacetophenone, and the coupling agents are silane coupling agents.

13. The liquid crystal display device according to claim 8, wherein the frame sealant comprises, by weight, 27% methyl methacrylate, n-butyl methacrylate, ethyl acrylate or n-butyl acrylate, 27% oligomers as shown in Structure Formula II, 10% organic powders, 10% inorganic powders, 10% epoxy resins, 15% heat curing agents, 0.5% photoinitiators and 0.5% coupling agents.

14. The liquid crystal display device according to claim 13, wherein the frame sealant comprises methyl methacrylate, the inorganic powders are silicon dioxide, the epoxy resins are bisphenol A epoxy resins, the heat curing agents are 3,5-dimethylaniline, the photoinitiators are 2,2-diethoxyacetophenone, and the coupling agents are silane coupling agents.

15. A process for preparing the frame sealant according to claim 1, characterized in that, it comprises the steps of:
   (1) weighing the various components of the frame sealant to form a mixture;
   (2) mixing and agitating the mixture; and
   (3) defoaming the mixture.

16. The use of the frame sealant according to claims 1 in the manufacture of a liquid crystal display panel.

* * * * *